United States Patent
Sakurada

(10) Patent No.: US 10,680,493 B2
(45) Date of Patent: Jun. 9, 2020

(54) VEHICLE DRIVE DEVICE

(71) Applicant: HONDA MOTOR CO., LTD., Tokyo (JP)

(72) Inventor: Manabu Sakurada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/281,782

(22) Filed: Feb. 21, 2019

(65) Prior Publication Data

US 2019/0260260 A1    Aug. 22, 2019

(30) Foreign Application Priority Data

Feb. 22, 2018  (JP) .................... 2018-030139

(51) Int. Cl.

| | | |
|---|---|---|
| H02K 5/24 | (2006.01) | |
| H02K 9/193 | (2006.01) | |
| H02K 11/33 | (2016.01) | |
| H02K 5/08 | (2006.01) | |
| G10K 11/162 | (2006.01) | |
| B60K 1/00 | (2006.01) | |

(52) U.S. Cl.
CPC ............. *H02K 5/24* (2013.01); *G10K 11/162* (2013.01); *H02K 5/08* (2013.01); *H02K 9/193* (2013.01); *H02K 11/33* (2016.01); *B60K 1/00* (2013.01); *B60Y 2306/09* (2013.01)

(58) Field of Classification Search
CPC ........... H02K 5/24; H02K 9/193; H02K 11/33
USPC .................................................. 310/400, 418
See application file for complete search history.

(56) References Cited

U.S. PATENT DOCUMENTS

2017/0282815 A1* 10/2017 Tomiyama .......... B60R 13/0884

FOREIGN PATENT DOCUMENTS

| JP | S39-007601 Y | 3/1964 | |
|---|---|---|---|
| JP | 09174724 A * | 7/1997 | |
| JP | 2012065435 A * | 3/2012 | |
| JP | 2017-181968 A | 10/2017 | |
| WO | WO-2018059380 A1 * | 4/2018 | ............. F04D 29/40 |

OTHER PUBLICATIONS

Sep. 25, 2019, Japanese Office Action issued for related JP Application No. 2018-030139.

* cited by examiner

*Primary Examiner* — Jose A Gonzalez Quinones
(74) *Attorney, Agent, or Firm* — Paratus Law Group, PLLC

(57) ABSTRACT

A vehicle drive device includes an electric motor that is configured to drive a vehicle, a case that houses therein the electric motor and a lubricating oil storage unit that stores lubricating oil, and a soundproof material that covers one side portion of the case. The one side portion of the case has a through hole through which a shaft member is inserted. An outer surface of the soundproof material is covered with a cover member. The cover member includes a partition wall portion that blocks a space between an opening of the through hole and the soundproof material.

6 Claims, 5 Drawing Sheets

US 10,680,493 B2

VEHICLE DRIVE DEVICE

CROSS-REFERENCE TO RELATED APPLICATIONS

The present application claims the benefit of priority of Japanese Patent Application No. 2018-030139, filed on Feb. 22, 2018, the content of which is incorporated herein by reference.

TECHNICAL FIELD

The present invention relates to a vehicle drive device to be mounted on an electric vehicle, a hybrid vehicle, and the like.

BACKGROUND ART

A case of a motor is attached with a soundproof material in order to reduce radiation sound of the motor. For example, JP-A-2017-181968 describes that a foam and a mass are interposed between an outer peripheral surface of a gearbox and a soundproof cover member for reducing noise in a motor unit of a power seat.

In recent years, a vehicle drive device using an electric motor as a drive source is mounted on an electric vehicle or a hybrid vehicle. In the vehicle drive device, a lubricating oil storage unit that stores lubricating oil such as ATF is provided inside a case, and a through hole through which a shaft member such as an axle can be inserted is provided on a side surface thereof.

That is, even if a soundproof structure of the motor unit in JP-A-2017-181968 were applied to the vehicle drive device and a soundproof material were attached to the case, lubricating oil would drip onto the soundproof material when the axle were pulled out in maintenance and the like, so that performance of the soundproof material would deteriorate. Meanwhile, in order to prevent deterioration in the performance of the soundproof material due to the lubricating oil, it is considered to provide the soundproof material while avoiding a range in which the lubricating oil drips. However, there is room for improvement in an aspect of soundproof performance.

SUMMARY

Accordingly, an aspect of the present invention provides a vehicle drive device having superior soundproof performance while reducing or preventing deterioration in performance of a soundproof material.

According to an embodiment of the present invention, there is provided a vehicle drive device including an electric motor that is configured to drive a vehicle, a case that houses therein the electric motor and a lubricating oil storage unit that stores lubricating oil, and a soundproof material that covers one side portion of the case.

The one side portion of the case includes a through hole through which a shaft member is inserted.

An outer surface of the soundproof material is covered with a cover member.

The cover member includes a partition wall portion that blocks a space between an opening of the through hole and the soundproof material.

According to the above configuration, the cover member that covers the outer surface of the soundproof material includes the partition wall portion that blocks the space between the opening of the through hole and the soundproof material. Therefore, performance of the soundproof material can be prevented from being deteriorated even when lubricating oil leaks out from the opening of the through hole.

DESCRIPTION OF EMBODIMENT

Figure 1:
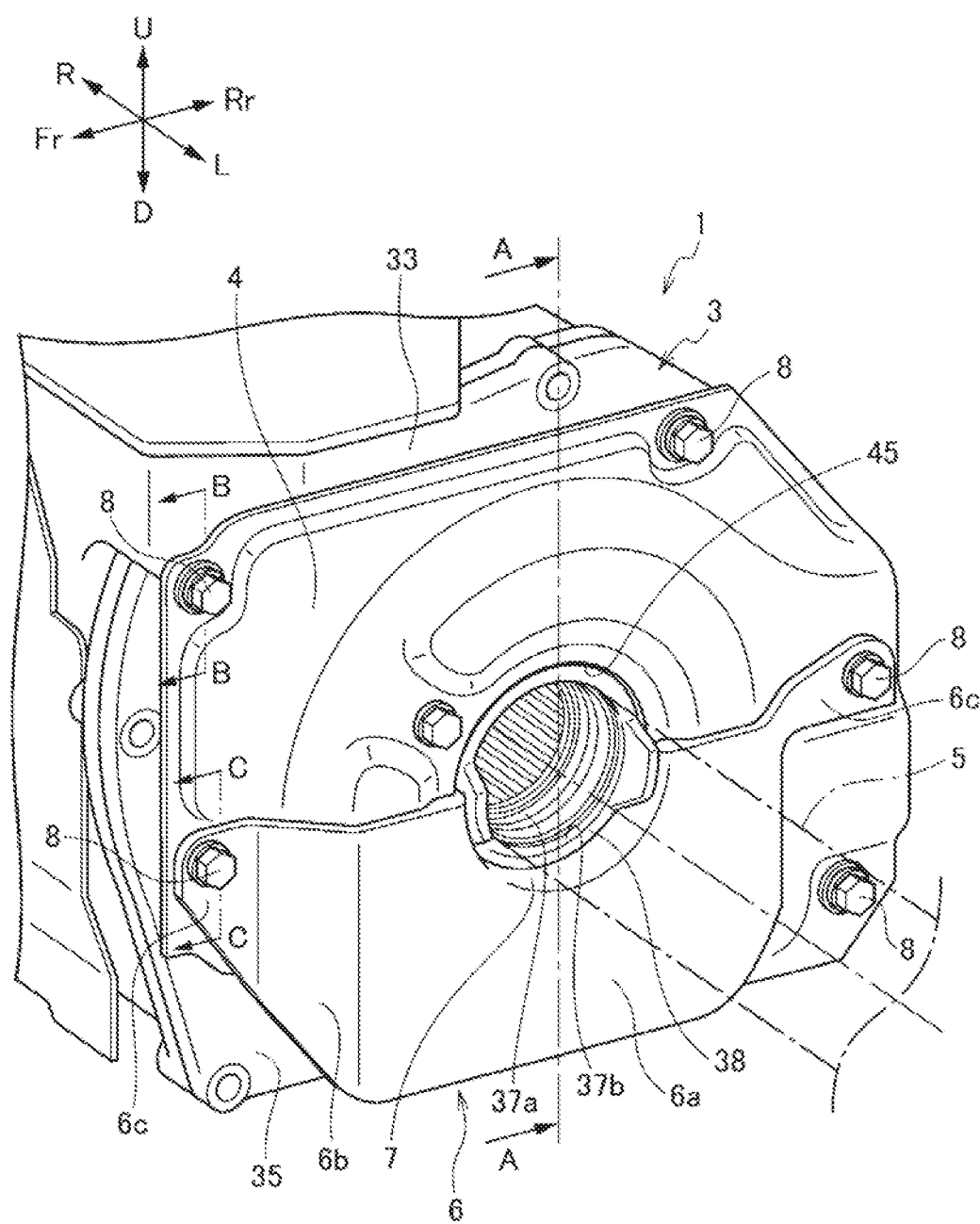
FIG. 1 is a perspective view of a vehicle drive device according to an embodiment of the present invention as viewed from an axle insertion portion side.

A vehicle drive device according to an embodiment of the present invention will be described below with reference to the accompany drawings. In the drawings, a front side of the vehicle drive device is denoted by Fr, a rear side is denoted by Rr, a left side is denoted by L, a right side is denoted by R, an upper side is denoted by U, and a lower side is denoted by D.

<Vehicle Drive Device>

Figure 2:
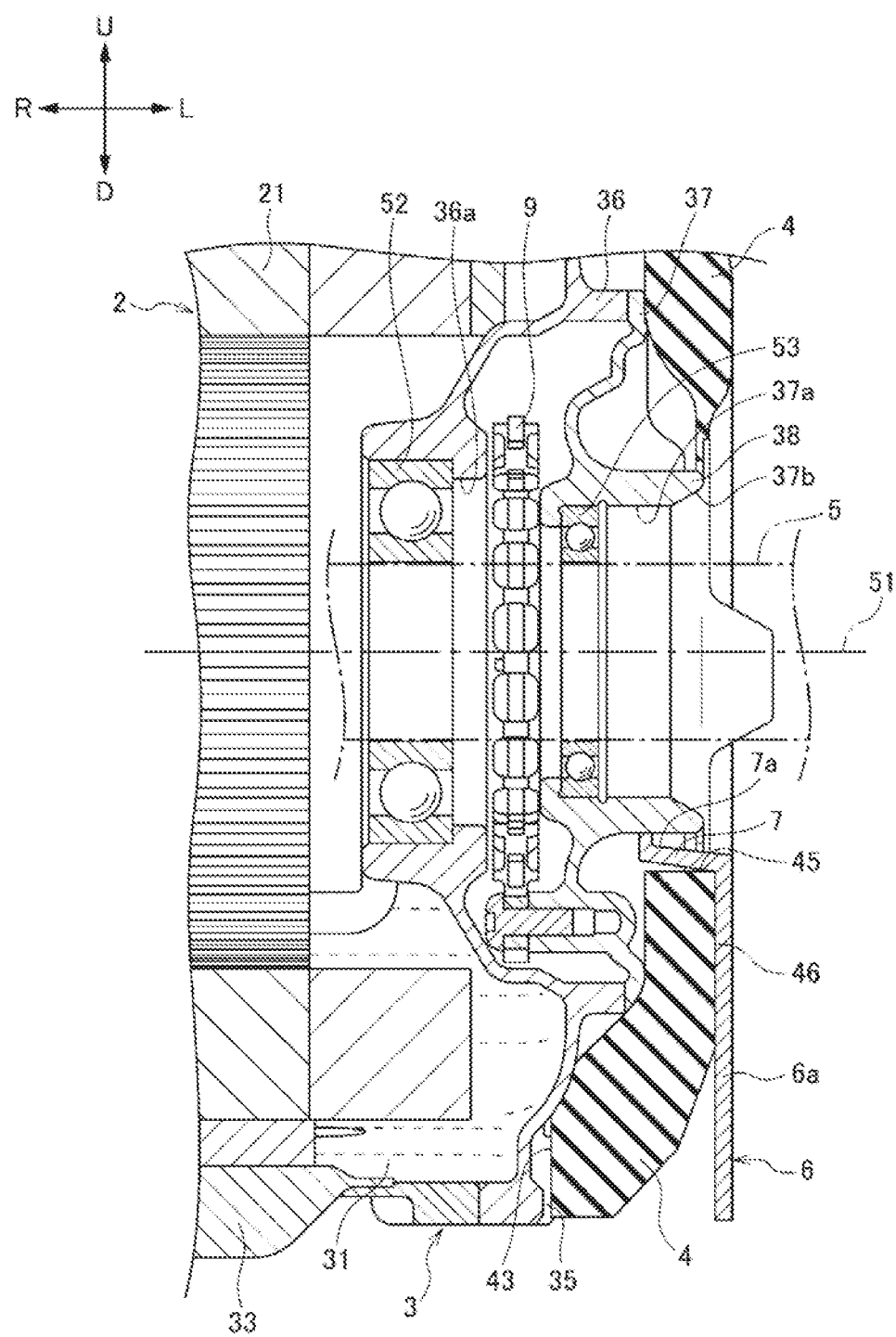
FIG. 2 is a cross-sectional view taken along a line A-A in FIG. 1.
Figure 3:
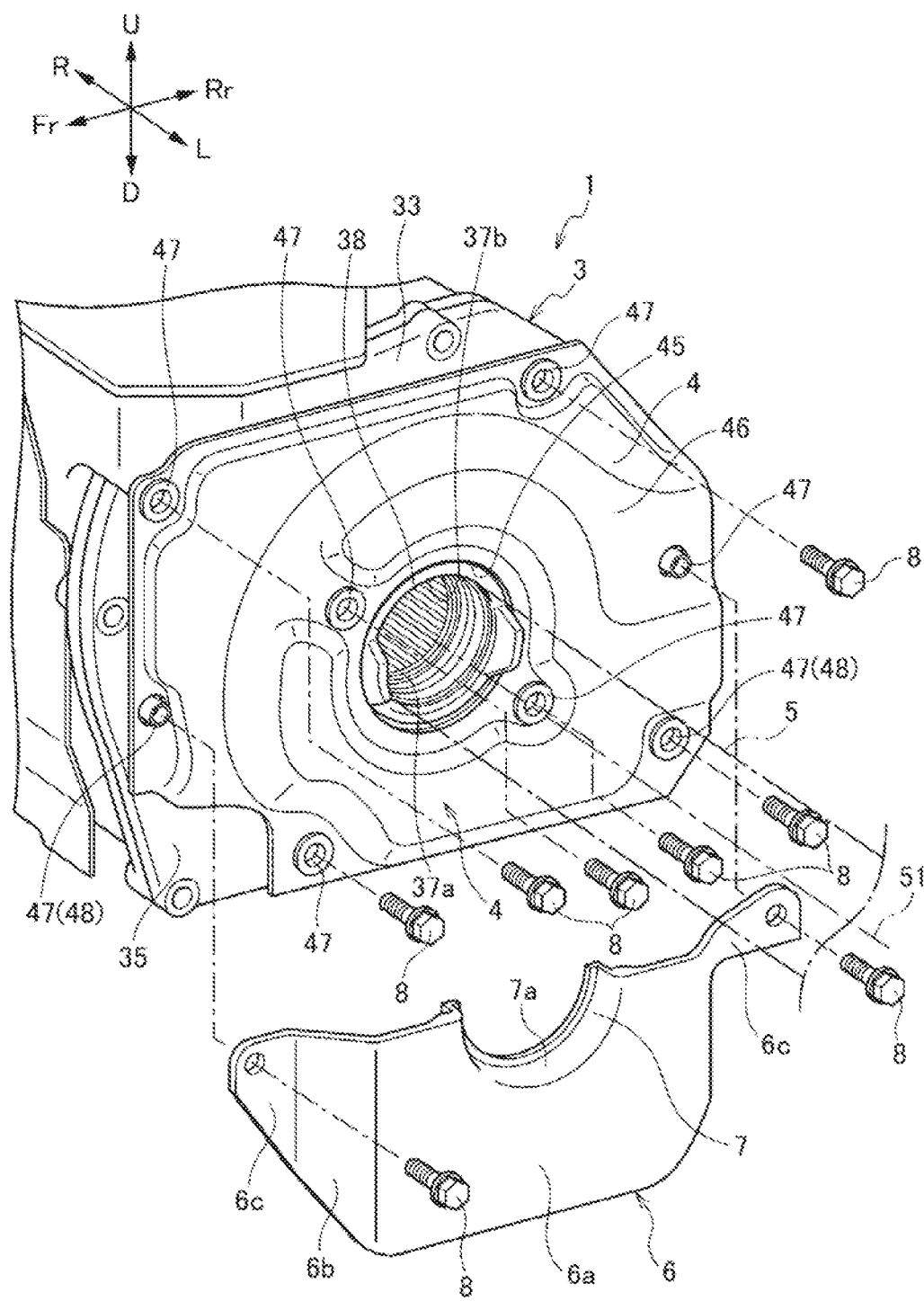
FIG. 3 is an exploded perspective view of the vehicle drive device in FIG. 1.

As illustrated in FIGS. 1 to 3, a vehicle drive device 1 according to the present embodiment includes a motor 2 that is configured to drive a vehicle, a case 3 that houses the motor 2, an axle 5 that is mechanically connected to the motor 2, and a soundproof material 4 that is configured to absorb radiation sound from the vehicle drive device 1.

The case 3 includes a cylindrical portion 33 that has a substantially cylindrical shape and that supports a stator 21 of the motor 2, and an axle insertion portion 35 that is located at both left and right end portions of the cylindrical portion and through which the axle 5 is inserted. The axle insertion portion 35 includes a first wall portion 36 and a second wall portion 37, and is formed by fixing the second wall portion 37 to the first wall portion 36. The first wall portion 36 supports the axle 5 via a bearing 52. The second wall portion 37 supports the axle 5 via a bearing 53 and supports the resolver stator 9 in a space between the first wall portion 36 and the second wall portion 37. Through holes 36a, 37a are formed on the first wall portion 36 and the second wall portion 37, respectively, coaxially with an axis 51 of the axle 5.

A tubular portion 38 surrounding the through hole 37a is provided on the second wall portion 37 and extends outward from a surface of the axle insertion portion 35. The axle 5 extends from an opening 37b of the through hole 37a formed in the tubular portion 38 to an outside of the case 3.

Lubricating oil (for example, automatic transmission fluid: ATF) is stored in the case 3 and lubricates gears (not illustrated) that transmit power of the motor 2 to the axle 5, bearings 52, 53, and the like. A reference numeral 31 in FIG. 2 denotes a lubricating oil storage unit that stores therein the lubricating oil.

The soundproof material 4 is attached to cover substantially the entire case 3. The soundproof material 4 has a sheet shape and is, for example, a foamed mat formed of synthetic rubber. Performance against noise and vibration (hereinafter also referred to as NV performance) of the vehicle drive device 1 can be improved by covering substantially the entire case 3 with the soundproof material 4. The following description will focus on the soundproof material 4 provided in the axle insertion portion 35 of the case 3, in particular, the soundproof material 4 provided in the axle insertion portion 35 on a left side surface of the case 3. Although description is omitted, the axle insertion portion 35 on a right side surface of the case 3 also has the similar configuration.

As illustrated in FIG. 3, the soundproof material 4 has a rectangular shape so as to cover substantially the entire axle insertion portion 35. The soundproof material 4 has a soundproof material opening 45 slightly larger than the tubular portion 38 to be concentric with the through hole 37a at a center portion thereof. The soundproof material 4 is fastened by bolts 8 via collars 12 (see FIGS. 4 and 5) at six soundproof material fastening portions 47 provided at an outer edge portion and two soundproof material fastening portions 47 located in a vicinity of the soundproof material opening 45.

Figure 4:
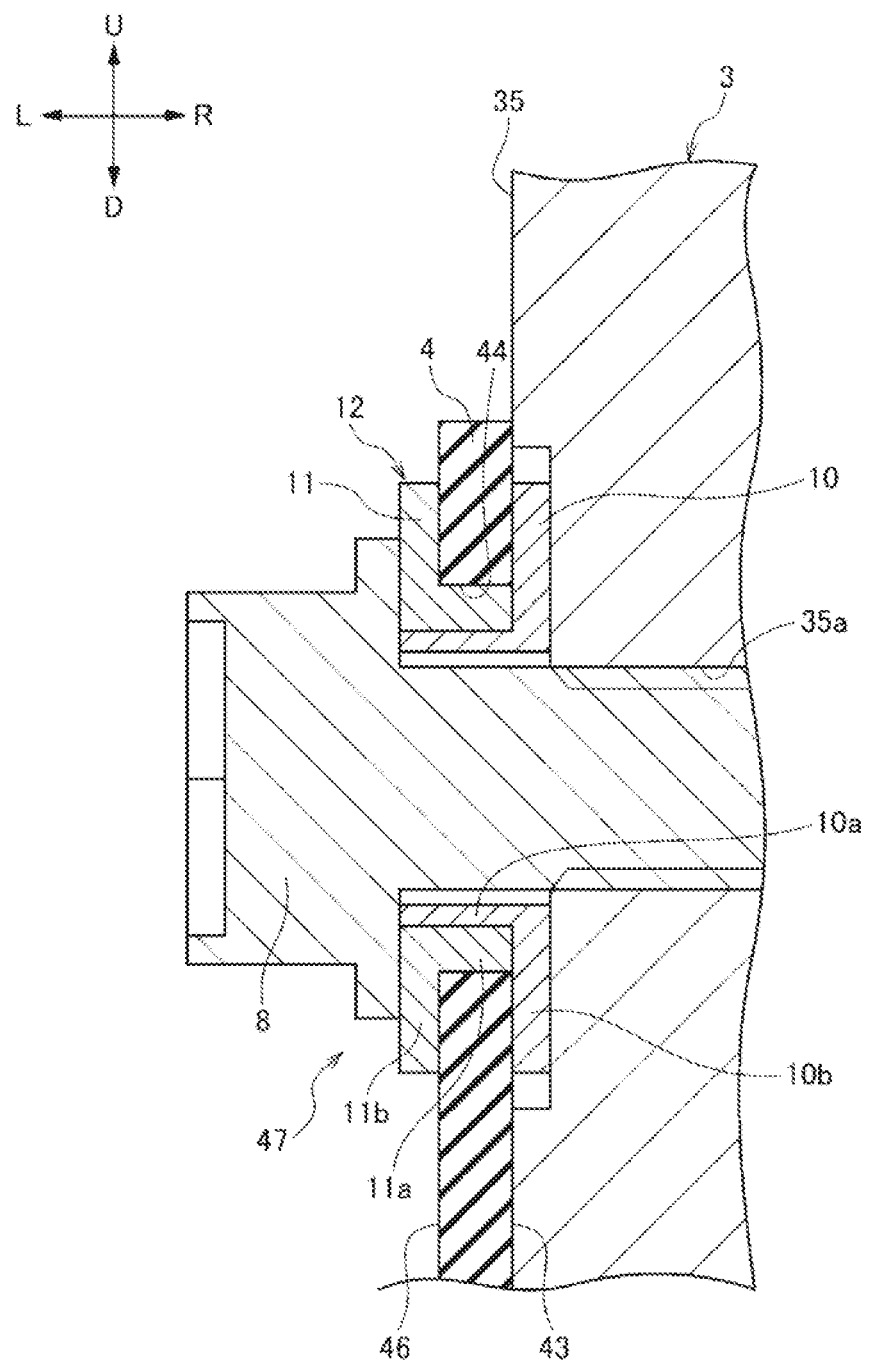
FIG. 4 is a cross-sectional view taken along a line B-B in FIG. 1.
Figure 5:
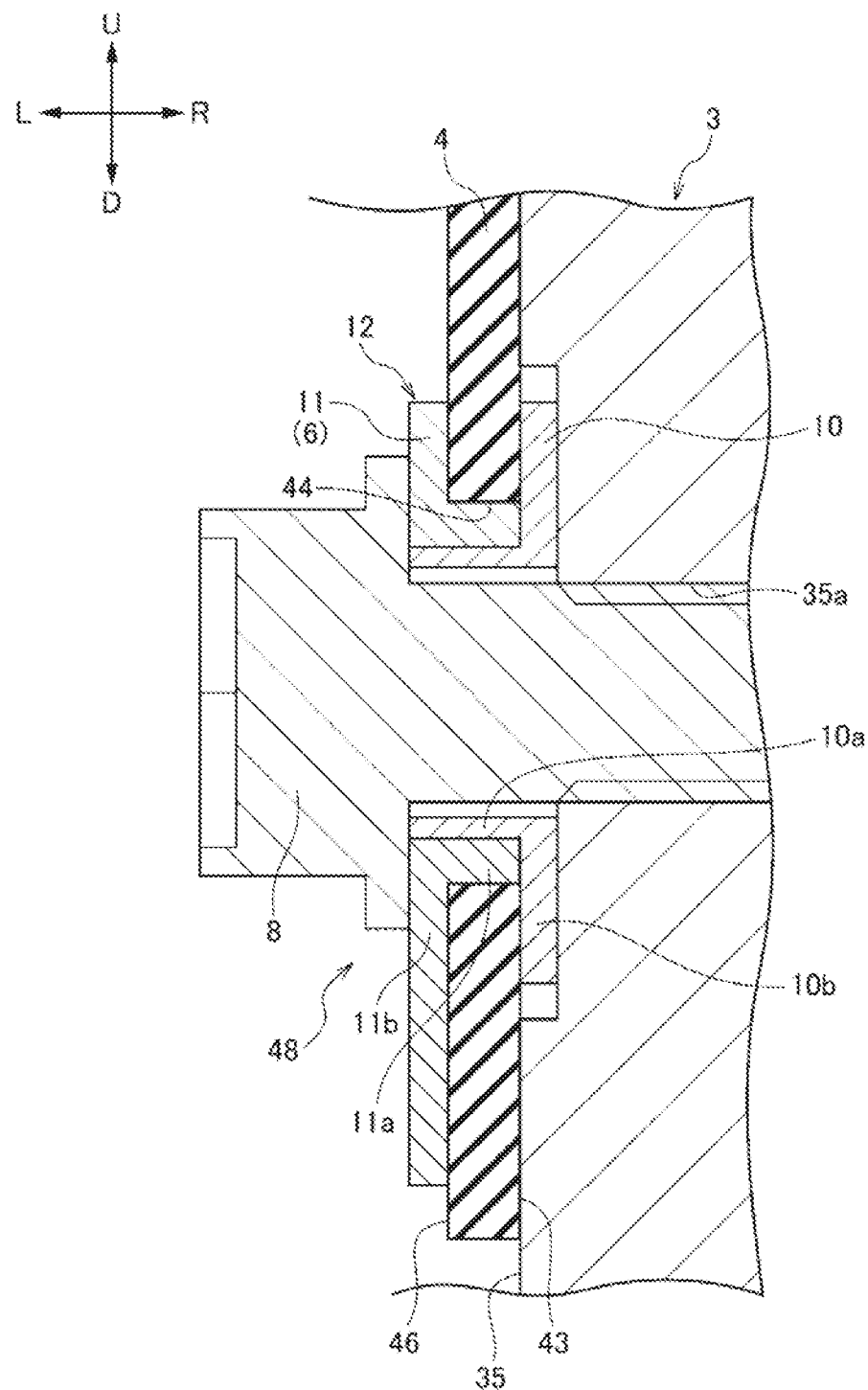
FIG. 5 is a cross-sectional view taken along a line C-C in FIG. 1.

As illustrated in FIG. 4, the collar 12 includes a lower collar 10 and an upper collar 11. The lower collar 10 includes a hollow first cylindrical portion 10a and a first flange portion 10b extending from a case side end portion of the first cylindrical portion 10a along the axle insertion portion 35. The upper collar 11 includes a hollow second cylindrical portion 11a surrounding the first cylindrical portion 10a, and a second flange portion 11b extending parallel to the first flange portion 10b from a head side end portion.

When the soundproof material 4 is attached, the first cylindrical portion 10a of the lower collar 10 is inserted into a collar insertion portion 44 formed in the soundproof material 4 from an inner surface 43 side of the soundproof material 4. Subsequently, the second cylindrical portion 11a of the upper collar 11 is inserted into the collar insertion portion 44 from an outer surface 46 side of the soundproof material 4 so as to surround the first cylindrical portion 10a. The soundproof material 4 is fixed to the case 3 by screwing the bolt 8 into a bolt hole 35a formed in the axle insertion portion 35 (soundproof material fastening portion 47). The inner surface 43 of the soundproof material 4 is in contact with the axle insertion portion 35, so that radiation sound and the like of the motor 2 emitted from the vehicle drive device 1 is absorbed by the soundproof material 4.

The soundproof material 4 is clamped by the first flange portion 10b of the lower collar 10 and the second flange portion 11b of the upper collar 11, so that a frictional force is generated between the inner surface 43 of the soundproof material 4 and the first flange portion 10b, and between the outer surface 46 of the soundproof material 4 and the second flange portion 11b, by a repulsive force of the soundproof material 4. Thus, the soundproof material 4 can be fixed using the repulsive force of the soundproof material 4, by clamping the soundproof material 4 with the first flange portion lob of the lower collar 10 and the second flange portion 11b of the upper collar 11.

When the axle 5 is pulled out at a time of maintenance of the vehicle drive device 1 to which the soundproof material 4 is attached as described above, the lubricating oil circulating inside the case 3 may leak out from the opening 37b of the through hole 37a and adhere to the soundproof material 4. If the lubricating oil adheres to the soundproof material 4, performance of the soundproof material 4 would deteriorate, so that it is necessary to protect the soundproof material 4 from the lubricating oil.

Accordingly, in the present embodiment, the outer surface 46 of the soundproof material 4 is covered with an attachment prevention cover 6 that reduces or prevents the lubricating oil from attaching to the soundproof material 4 so as to reduce or prevent the lubricating oil leaking from the opening 37b of the through hole 37a of the case 3 from attaching to the soundproof material 4.

The attachment prevention cover 6 includes a cover body 6a having a substantially rectangular shape as viewed from a left surface side of the vehicle drive device 1, a cover inclined portion 6b that is provided on a left side of the cover body 6a and is inclined along a shape of the soundproof material 4, and a cover fix portion 6c attached to the axle insertion portion 35 of the case 3. The attachment prevention cover 6 is provided below a horizontal plane passing through the axis 51 of the axle 5. Manufacturing costs can be reduced by providing the attachment prevention cover 6 in a necessary minimum range which can prevent the lubricating oil from dripping.

The cover body 6a includes a partition wall portion 7 that is bent inward from the cover body 6a so as to surround the tubular portion 38 of the axle insertion portion 35 and is provided close to an outer peripheral surface of the tubular portion 38.

The partition wall portion 7 includes a guide surface 7a that is inclined from the inner surface 43 side of the soundproof material 4 toward the outer surface 46 side of the soundproof material 4 in a direction away from the axis 51 of the through hole 37a (downward in a cross-sectional view in FIG. 2). Accordingly, lubricating oil dripping from the opening 37b of the through hole 37a can be guided to the outside. It is advantageous that a tip end portion of the partition wall portion 7 is as close as possible to or in contact with the outer peripheral surface of the tubular portion 38 in order to prevent the lubricating oil from entering the soundproof material 4 side.

The cover fix portion 6c is located at both left and right end portions at an upper side of the substantially rectangular cover body 6a. The attachment prevention cover 6 is fixed to the case 3 by the bolts 8 together with the soundproof material 4 by using the two soundproof material fastening portions 47 (hereinafter also referred to as cover fix portions 48) in a vicinity of the horizontal plane passing through the axis 51 of the axle 5 among the six soundproof material fastening portions 47 provided on the outer edge portion of the soundproof material 4. The attachment prevention cover 6 is fixed to the axle insertion portion 35 of the case 3 together with the soundproof material 4 by the bolts 8, so that the attachment prevention cover 6 can be fixed without increasing the number of bolts only used to fasten the attachment prevention cover 6.

Here, the attachment prevention cover 6 in the present embodiment is formed integrally with the upper collar 11 disposed on the cover fix portion 48. In other words, the cover fix portion 6c of the attachment prevention cover 6 includes the second flange portion 11b of the upper collar 11 and the second cylindrical portion 11a. Accordingly, the number of components can be reduced by integrally forming the attachment prevention cover 6 and the upper collar 11.

The above-described embodiment may be appropriately modified, improved, and the like.

For example, the partition wall portion 7 illustrated in FIGS. 1 to 3 has a structure that is inclined uniformly (straightly) radially outward from the inner surface side of the soundproof material 4 toward the outer surface side of the soundproof material 4. However, the partition wall portion 7 may have a shape curved radially outward from the inner surface side toward the outer surface side or a shape inclined in a stepwise manner from the inner surface side toward the outer surface side as long as the partition wall portion 7 has a shape that guides the lubricating oil in a direction away from the soundproof material 4.

In addition to a function of preventing attachment of the lubricating oil to the outer surface 46 of the soundproof material 4, the attachment prevention cover 6 can also function as a guard member at a time of a collision. In the above embodiment, the attachment prevention cover 6 is provided below the horizontal plane passing through the axis 51 of the axle 5, but the attachment prevention cover 6 may be provided so as to cover the entire outer surface 46 of the soundproof material 4.

A manner of attaching the soundproof material 4 and the attachment prevention cover 6 to the case 3 is also not particularly limited. Also, when the attachment prevention cover 6 and the soundproof material 4 are fixed by the bolts 8, a position at which the attachment prevention cover 6 and the soundproof material 4 is fixed, and the number of the bolts 8 by which the attachment prevention cover 6 and the soundproof material 4 are fixed can be changed appropriately.

In the meantime, at least the following matters are described in the present specification. Although the corresponding constituent elements and the like in the above-described embodiment are shown in parentheses, the present invention is not limited thereto.

(1) A vehicle drive device (vehicle drive device 1) includes:

an electric motor (motor 2) that is configured to drive a vehicle;

a case (case 3) that houses therein the electric motor and a lubricating oil storage unit (lubricating oil storage unit 31) that stores lubricating oil (lubricating oil); and a soundproof material (soundproof material 4) that covers one side portion (axle insertion portion 35) of the case.

The one side portion of the case has a through hole (through hole 37a) through which a shaft member (axle 5) is inserted.

An outer surface (outer surface 46) of the soundproof material is covered with a cover member (attachment prevention cover 6).

The cover member includes a partition wall portion (partition wall portion 7) that blocks a space between an opening (opening 37b) of the through hole and the soundproof material.

According to (1), the cover member that covers the outer surface of the soundproof material includes the partition wall portion that blocks the space between the opening of the through hole and the soundproof material, so that even when lubricating oil leaks out from the opening of the through hole, performance of the soundproof material can be prevented from being deteriorated. In addition, the cover member can also function as a guard member at a time of a collision.

(2) In the vehicle drive device according to (1), the cover member is provided below an axis (an axis 51) of the through hole.

According to (2), manufacturing costs can be reduced by providing the cover member in a necessary minimum range which can reduce or prevent the lubricating oil from dripping.

(3) In the vehicle drive device according to (1) or (2), the partition wall portion includes a guide surface (guide surface 7a) that is inclined or curved from an inner surface (inner surface 43) side of the soundproof material toward an outer surface (outer surface 46) side of the soundproof material in a direction away from an axis of the through hole, According to (3), the partition wall portion includes the guide surface that is inclined or curved from the inner surface side of the soundproof material toward the outer surface side of the soundproof material in the direction away from the axis of the through hole, so that lubricant oil dripping from the opening of the through hole can be guided to the outside.

(4) In the vehicle drive device according to any one of (1) to (3), the soundproof material is fixed to the one side portion of the case by a fastening member (bolt 8) via a collar (collar 12).

The collar includes:

a first collar (lower collar 10) that includes a first cylindrical portion (first cylindrical portion 10a) surrounding a shaft portion of the fastening member and a first flange portion (first flange portion 10b) extending from one end portion (case side end portion) of the first cylindrical portion; and a second collar (upper collar 11) that includes a second cylindrical portion (second cylindrical portion 11a) surrounding the first cylindrical portion and a second flange portion (second flange portion 11b) extending from another end portion (head side end portion) of the second cylindrical portion.

The soundproof material is clamped by the first flange portion and the second flange portion.

According to (4), the soundproof material can be fixed using the repulsive force of the soundproof material by clamping the soundproof material with the first flange portion of the first collar and the second flange portion of the second collar.

(5) In the vehicle drive device according to (4), the cover member is fixed to the one side portion of the case together with the soundproof material by the fastening member.

According to (5), the cover member is fixed to the one side portion of the case together with the soundproof material by the fastening member, so that the cover member can be fixed without increasing the number of the fastening member only used to fasten the cover member.

(6) In the vehicle drive device according to (5), the cover member is formed integrally with the second collar.

According to (6), the number of the components can be reduced by forming the cover member integrally with the second collar.

The invention claimed is:

1. A vehicle drive device comprising:
an electric motor that is configured to drive a vehicle;
a case that houses therein the electric motor and a lubricating oil storage unit that stores lubricating oil; and
a soundproof material that covers one side portion of the case,
wherein the one side portion of the case has a through hole through which a shaft member is inserted,
wherein an outer surface of the soundproof material is covered with a cover member, and
wherein the cover member includes a partition wall portion that blocks a space between an opening of the through hole and the soundproof material.

2. The vehicle drive device according to claim 1, wherein the cover member is provided below an axis of the rough hole.

3. The vehicle drive device according to claim 1, wherein the partition wall portion includes a guide surface that is inclined or curved from an inner surface side of the soundproof material toward an outer surface side of the soundproof material in a direction away from an axis of the through hole.

4. The vehicle drive device according to claim 1,
wherein the soundproof material is fixed to the one side portion by a fastening member via a collar,
wherein the collar includes:
- a first collar that includes a first cylindrical portion surrounding a shaft portion of the fastening member and a first flange portion extending from one end portion of the first cylindrical portion; and
- a second collar that includes a second cylindrical portion surrounding the first cylindrical portion and a second flange portion extending from another end portion of the second cylindrical portion, and wherein the soundproof material is clamped by the first flange portion and the second flange portion.

5. The vehicle drive device according to claim 4,
wherein the cover member is fixed to the one side portion of the case together with the soundproof material by the fastening member.

6. The vehicle drive device according to claim 5,
wherein the cover member is formed integrally with the second collar.

\* \* \* \* \*